United States Patent
Farkas

(10) Patent No.: US 11,535,011 B2
(45) Date of Patent: Dec. 27, 2022

(54) BAG-IN-BOX FILM FOR PACKAGING REFRIGERATED LIQUIDS

(71) Applicant: Liqui-Box Corporation, Richmond, VA (US)

(72) Inventor: Nicholas Farkas, Kingston (CA)

(73) Assignee: Liqui-Box Corporation, Richmond, VA (US)

( * ) Notice: Subject to any disclaimer, the term of this patent is extended or adjusted under 35 U.S.C. 154(b) by 565 days.

(21) Appl. No.: 16/010,599

(22) Filed: Jun. 18, 2018

(65) Prior Publication Data

US 2018/0370201 A1    Dec. 27, 2018

Related U.S. Application Data

(60) Provisional application No. 62/523,433, filed on Jun. 22, 2017.

(51) Int. Cl.

| | |
|---|---|
| *B32B 27/08* | (2006.01) |
| *B32B 27/32* | (2006.01) |
| *B65D 65/40* | (2006.01) |
| *B65D 85/80* | (2006.01) |
| *B65B 3/04* | (2006.01) |

(Continued)

(52) U.S. Cl.
CPC .............. *B32B 27/08* (2013.01); *B32B 27/32* (2013.01); *B65B 3/02* (2013.01); *B65B 3/045* (2013.01); *B65D 65/40* (2013.01); *B65D 75/48* (2013.01); *B65D 77/062* (2013.01); *B65D 85/80* (2013.01); *B32B 2250/05* (2013.01); *B32B 2250/24* (2013.01); *B32B 2270/00* (2013.01); *B32B 2307/558* (2013.01); *B32B 2439/46* (2013.01); *Y10T 428/13* (2015.01); *Y10T 428/1352* (2015.01)

(58) Field of Classification Search
CPC ..... B32B 2439/46; B32B 27/08; B32B 27/32; B32B 2250/05; B32B 2250/24; B32B 2270/00; B32B 2307/558; Y10T 428/13; Y10T 428/1352
USPC .......................................................... 428/35.2
See application file for complete search history.

(56) References Cited

U.S. PATENT DOCUMENTS

| | | |
|---|---|---|
| 5,538,590 A | 7/1996 | Riley |
| 9,115,275 B2 | 8/2015 | Kupar et al. |

(Continued)

FOREIGN PATENT DOCUMENTS

| | | |
|---|---|---|
| CN | 104870490 A | 8/2015 |
| WO | 2016022148 A1 | 2/2016 |

OTHER PUBLICATIONS

Elite 5400G Data Sheet Published Jan. 2003 (Year: 2003).*
Innate Published 2016 (Year: 2016).*
Elite AT 6401 (Year: 2015).*

*Primary Examiner* — Ellen S Hock
(74) *Attorney, Agent, or Firm* — McAndrews, Held & Malloy, Ltd.

(57) ABSTRACT

Multi-layer films for making bags for containing flowable materials, in particular to large bags for dairy products. The multi-layer films have an outer and an inner sealant layer and a core layer and optionally, an interposed layer positioned between the outer sealant layer and the core layer and between the core layer and the inner sealant layer. The outer and inner sealant layers contain an ethylene/α-olefin interpolymer composition and the intermediate layer optionally contains this interpolymer composition.

15 Claims, 1 Drawing Sheet

(51) Int. Cl.
  *B65D 77/06*  (2006.01)
  *B65B 3/02*  (2006.01)
  *B65D 75/48*  (2006.01)

(56) References Cited

U.S. PATENT DOCUMENTS

| | | |
|---|---|---|
| 9,327,856 B2 | 5/2016 | Kastens |
| 9,440,757 B2 | 9/2016 | Kastens |
| 2013/0210990 A1 | 8/2013 | Demirors et al. |
| 2015/0132514 A1 | 5/2015 | Wang et al. |
| 2015/0148490 A1* | 5/2015 | Kapur ................. C08L 23/0815 |
| | | 525/240 |
| 2015/0232711 A1 | 8/2015 | Kapur et al. |
| 2015/0259586 A1 | 9/2015 | Kapur et al. |
| 2017/0225862 A1* | 8/2017 | Schnabel ............. B65D 77/068 |

* cited by examiner

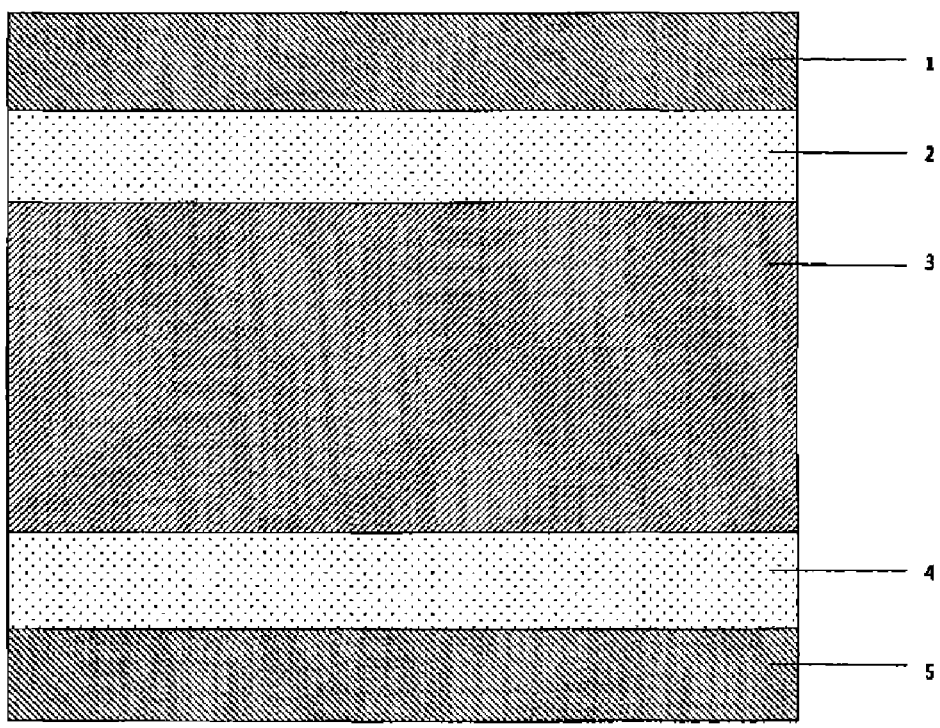

BAG-IN-BOX FILM FOR PACKAGING REFRIGERATED LIQUIDS

CROSS REFERENCE TO RELATED APPLICATION

This application claims the benefit of U.S. Provisional Application No. 62/523,433 filed Jun. 22, 2017, the entirety of which is incorporated by reference herein for any and all purposes.

FIELD OF THE INVENTION

This invention relates to ethylene polymer based multi-layer films used to form bags for flowable liquid products that have improved bag toughness particularly under chilled condition, e.g. 0-10° C. as measured by a bag drop test wherein a liquid filled bag is dropped from a set height.

BACKGROUND

In one aspect, the present invention relates to packaging flowable liquid products, such as, dairy products in bags for bag in box packaging, Typically, such bags are made using bag forming equipment wherein rolls of film are unwound to form a bag that is labeled with a code via inkjet printer and the bag is punched to form a hole for the spout and the spout is inserted and the bag is sealed on the long sides and usually brushed to remove air and then cross sealed at the bottom of one bag and at the top of the next bag being made and pulled through the line and perforated adjacent to the cross seals and packaged for use on a bag in box filling line.

For reasons of economy, customers are demanding thinner films for bags for liquid products. This often leads to problems in commercially available films such as, (1) inadequate seal strength and toughness particularly as measured by a bag drop test wherein a liquid filled bag is dropped from predetermined heights. Reduction in bag performance has been noted in the dairy industry, in particular, for bags that are filled with chilled or refrigerated dairy products and more particularly, relative large bags, e.g., 1-6 gallon bags and larger. Such dairy product filled bags made from currently commercially available films, bag performance decreases significantly as the temperature is lowered. This is particularly noted under when exposed to temperature changes and handling under shipment and distribution and results in issues of leakage of such bags due to tears and breaks in seals of the bag, primarily is side and bottom seals and around the spout of the bag.

The multilayer film utilized in the present invention provides an excellent bag for dairy products, in particular, large bag in the box dairy products. The film is tough and durable and withstands low temperatures and temperature changes occurring during shipping and handling and essentially eliminates tears and breaks in seals of the bags which result in leakage. The film contains an ethylene/α-olefin interpolymer compositions as disclosed in U.S. Pat. No. 9,115,275 issued Aug. 25, 2015 that is hereby incorporated by reference hereinafter "U.S. Pat. No. 9,115,275".

SUMMARY OF THE INVENTION

The present invention relates to a number of multi-layer films for making bags for containing flowable materials. Basically, these multi-layer films have an outer and an inner sealant layer and a core layer and optionally, an interposed layer positioned between the outer sealant layer and the core layer and between the core layer and the inner sealant layer. The outer and inner sealant layers contain an ethylene/α-olefin interpolymer composition and the interposed layer preferably contains this interpolymer composition.

It should be noted that each layer, such as the sealant layer, can have multiple layers such as 2, 3, 4, 5 and the like and the outer sealant layer and inner sealant layer can be the same or each have a different number of layers, e.g., the outer sealant layer can have four layers while the inner sealant layer can have 2 layers. Similarly, the interposed layer between the core and the outer sealant layer can have a different number of layers in comparison to the interposed layer between the core and inner sealant layer. The core can have a number of layers and need not be a single layer.

The ethylene/α-olefin interpolymer composition comprises from 50-75% by weight of a first ethylene/α-olefin copolymer fraction having a density in the range of 0.894 to 0.908 g/cc; a melt index in the range of 0.2 to 1 g/10 min. and from 25 to 50 percent by weight of a second ethylene/α-olefin copolymer fraction and wherein the interpolymer has a density in the range of 0.910 to 0.924 g/cc and a melt index in the range from 0.5 to 2 g/10 min; a zero shear viscosity ratio (ZSVR) in the range of from 1.15 to 2.5; a molecular weight distribution, expressed as the ratio of the weight average molecular weight (Mw/Mn) in the range of 2.0 to 4.0, and tan delta at 0.1 radian/seconds and 190° C. in the range of 6 to 43 and as further described in U.S. Pat. No. 9,115,575 and will be referred to hereinafter as "ethylene/α-olefin interpolymer".

The ethylene/α-olefin interpolymer composition is further defined as a composition having 2 peaks on elution profile via crystallization elution fractionation (CEF) procedure, wherein each peak comprises at least 25 weight percent of the total area of the elution profile, wherein the separation of the 2 peak positions are in the range of from 20 to 40° C., wherein a higher elution temperature peak is at an elution temperature greater than 90° C., and wherein a lower elution temperature peak is at an elution temperature in the range of from 50 to 80° C., and wherein the width of the higher elution temperature peak at 50 percent peak height is less than 4° C., and wherein the width of the higher elution temperature peak at 10 percent peak height is less than 9° C., and wherein the width of the lower elution temperature peak at 50 percent peak height is less than 8° C., and wherein the width of the lower elution temperature peak at 10 percent height is less than 25° C.

A preferred ethylene/α-olefin interpolymer composition comprises a polymer fraction of a LLDPE (linear low density polyethylene) and a second copolymer fraction of ethylene/octene-1 copolymer and the interpolymer having a density of 0.915 g/cc. and a melt index of 0.85 g/10 min.: herein after "preferred ethylene/α-olefin interpolymer".

The following show multilayer structures that illustrate the invention:

A multilayer structure that comprises at least three layers of: (Structure 3 & 4)

(1) an outer and an inner sealant layer comprising the preferred ethylene/α-olefin interpolymer. As pointed out above the outer and inner sealant layers may be multiple layers and need not be identical in the number of layers and total thickness of the sealant layer.

(2) a core layer of LLDPE (linear low density polyethylene), ethylene/octene-1 copolymer having a melt index of 1.0 g/10 min. and density of 0.916 g/cc. ("Elite 5400G). The core layer may be single layer or multiple layers, e.g., 2-8 layers;

Alternatively, the core layer may comprise 30-100% by weight of LLDPE, ethylene/octene-1 copolymer having a melt index of 1.0 g/10 min. and density of 0.916 g/cc. ("Elite 5400G) and 70-0% by weight of LLDPE, ethylene/butene copolymer having a melt index of 1.0 g/10 min. and a density of 0.918 g/cc. Preferably, the copolymers can be in a weight ratio of 40/60.

An additional alternative core layer may comprise 30-100% by weight of LLDPE, ethylene/hexene-1 copolymer having a melt index of 1.0 g/10 min. and density of 0.916 g/cc. ("Elite 5400G) and 70-0% by weight of LLDPE, ethylene/hexene copolymer having a melt index of 1.0 g/10 min. and a density of 0.918 g/cc.(DFDC 7087). Preferably, the copolymers can be in a weight ratio of 40/60.

Another aspect of this invention is directed to multilayer film having the following structure: (Structure 9)

(1) an inner and an outer sealant layer comprising ULDPE (ultra-low density polyethylene), ethylene/octene-1 copolymer having a melt index of 0.85 g/10 min. and density of 0.912 g/cc. ("Elite AT 6401) and an ethylene/α-olefin interpolymer, for example, LLDPE, ethylene/octene-1 copolymer having a melt index of 0.85 g/10 min. and density of 0.920 g/cc (XUS 59900.100);

(2) an interposed layer of the preferred ethylene/α-olefin interpolymer.

(3) a core layer of LLDPE, ethylene/octene-1 copolymer having a melt index of 1.0 g/10 min. and density of 0.916 g/cc. ("Elite 5400G).

Alternatively, the core layer may comprise 30-100% by weight of LLDPE, ethylene/octene-1 copolymer having a melt index of 1.0 g/10 min. and density of 0.916 g/cc. ("Elite 5400G) and 70-0% by weight of LLDPE, ethylene/butene copolymer having a melt index of 1.0 g/10 min. and a density of 0.918 g/cc.(DFDC 7087). Preferably, the copolymers can be in a weight ratio of 40/60.

An additional alternative core layer may comprise 30-100% by weight of LLDPE, ethylene/hexene-1 copolymer having a melt index of 1.0 g/10 min. and density of 0.916 g/cc. ("Elite 5400G) and 70-0% by weight of LLDPE, ethylene/hexene copolymer having a melt index of 1.0 g/10 min. and a density of 0.918 g/cc.(DFDC 7087). Preferably, the copolymers can be in a weight ratio of 40/60.

Still other aspects of the invention include multilayer films of various combinations of the above mentioned layers. An important aspect of the multilayer film is that at least the outer and inner layers contain the preferred ethylene/α-olefin interpolymer or an intermediate layer can contain the preferred ethylene/α-olefin interpolymer or the inner and outer layer and intermediate layer contain the preferred ethylene/α-olefin interpolymer. Optionally, it may be desirable for the core to contain a fraction of the preferred interpolymer.

BRIEF DESCRIPTION OF DRAWINGS

FIG. 1 shows a general schematic of a multi-layer film of the present invention.

DESCRIPTION OF THE INVENTION

Definitions and Terms

All percentages expressed in the present patent application are by weight of the total weight of the composition unless expressed otherwise.

All ratios expressed in this patent application are on a weight: weight basis unless expressed otherwise.

Ranges are used as shorthand only to avoid listing and describing each and every value within the range. Any appropriate value within the range can be selected as the upper value, the lower value, or the end-point of the range.

The singular form of a word includes its plural, and vice versa, unless the context clearly dictates otherwise. Thus, references "a," "an," and "the" generally include the plurals of the respective terms they qualify. For example, reference to "a method" includes its plural-"methods." Similarly, the terms "comprise," "comprises," and "comprising," whether used as a transitional phrase in the claims or otherwise, should be interpreted inclusively rather than exclusively. Likewise the terms "include," "including," and "or" should be construed to be inclusive, unless such a construction is clearly prohibited from the context. Similarly, the term "examples," particularly when followed by a listing of terms, is merely exemplary and illustrative and should not be deemed to be exclusive or comprehensive.

Methods, compositions, and other advances disclosed in this patent application are not limited to particular methodology, protocols, and reagents described in the application because, as the skilled artisan will appreciate, they may vary. Further, the terminology used in this application describes particular embodiments only, and should not be construed as limiting the scope of what is disclosed or claimed.

Unless defined otherwise, all technical and scientific terms, terms of art, and acronyms used in the present application have the meanings commonly understood by one of ordinary skill in the art in the field(s) of the invention, or in the field(s) where the term is used. Although any compositions, methods, articles of manufacture, or other means or materials similar or equivalent to those described in the present patent application can be used in the practice of the present invention, specific compositions, methods, articles of manufacture, or other means or materials are described only for exemplification.

All patents, patent applications, publications, technical and/or scholarly articles, and other references cited or referred to in this patent application are incorporated in their entirety by reference to the extent allowed by law. The discussion of those references is intended merely to summarize the assertions made in these references. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

As used herein, the term "flowable material" does not include gaseous materials powders or other solid materials, but encompasses liquid materials which are flowable under gravity or may be pumped. Such materials include liquids, for example, milk, water, fruit juice, oil; emulsions, for example, ice cream mix, soft margarine. The invention described herein is particularly useful for flowable foods such as milk especially packaged at refrigerated temperatures.

As used herein "density" is determined by ASTM D 792 and "melt-index" by ASTM D 1238. The "melting point" of a polymer is measured as the peak melting point when performing differential scanning calorimetry (DSC) as described in ASTM Procedure D3417-83 (rev. 88).

In particular, this invention relates to multi-layer films usable for bags for packaging liquid flowable materials, typically dairy products. More specifically, this invention provides a multi-layer film that is lower in gauge (thickness) but exhibits superior toughness and seal strength, especially under refrigerated conditions as shown by higher bag drop heights (F50 values) as measured by the Bruceton staircase bag drop test method.

In one embodiment, the multi-layer film comprises five layers (FIG. 1): a first outer sealant layer and an inner sealant layer (5) of the preferred ethylene/α-olefin interpolymer; a second interposed layer (2) of the preferred ethylene/α-olefin interpolymer and a third layer (3) being a core layer of a core layer of LLDPE, ethylene/octene-1 copolymer having a melt index of 1.0 g/10 min. and density of 0.916 g/cc. ("Elite 5400G) and LLDPE, ethylene butane copolymer having a melt index of 1.0 g./10 min. and a density of 0.918 g/cc. (DFDC 7087). The core layer may be a single layer or multiple layers of at least 3 layers or more; the fourth (4) being another interposed layer of the same composition as the second layer and the fifth layer (5) being the inner sealant layer described above. The first outer sealant layer and the fifth sealant layer each comprise about 10-30% of the thickness of the multilayer film. The intermediate layers (second and fourth layers) comprise about 5-20% of the thickness of the multilayer film and the core layer comprises about 30-50% of the thickness of the multilayer film. The total layer of the multilayer film is about 1-5 mils in thickness, preferably 1-2.5 mils in thickness and more preferably 1-2.0 mils in thickness.

It was found that by using the preferred ethylene/α-olefin interpolymer in the inner and outer sealant layers significantly improved impact resistance and bag drop performance, particularly under cold conditions resulted in comparison to conventional bags formed with multilayer films that did not have the preferred ethylene/α-olefin interpolymer component in the outer and inner sealant layers of the bag film. Also, a portion of the core can contain the preferred interpolymer for performance improvement. Improved results were noted when the preferred interpolymer was used in the optional interposed layer in the bag film. The multi-layer film of this invention is a clear film that runs well on bag forming machines and is particularly desired, for example, for making milk bags in the 1-6 gallon size range.

The Outer and Inner Sealant Layers

In one embodiment, the multi-layer film comprises at least one outer sealant layer and at least one inner sealant layer. The outer sealant layer is externally on one side of the multi-layer film, and the inner sealant layer is externally on the other side of the multi-layer film. The outer and inner sealing layers can comprise more than one layer of film, for example, 2, 3, 4 or more layers of film. The thicknesses of the outer and inner sealing layers are usually the same but can have different thicknesses.

The outer and inner sealant layers can comprise about 10-100% by weight of the preferred ethylene/α-olefin interpolymer and can contain up to 90% by weight of a polymer of ultralow density polyethylene (ULDPE), ethylene/octene-1 copolymer having a density in the range of about 0.910 to 0.914 g/cc and a melt index of about 0.7 to 1.0 g/10 min. or a linear low density polyethylene (LLDPE), ethylene/octene-1 copolymer having a density in the range of about 0.917 to 0.925 g/cc and a melt index of about 0.7 to 1.0 g/10 min. One useful sealing layer comprises about 75-90% by weight of an ultralow density polyethylene (ULDPE) having a density in the range of about 0.911 to 0.913 g/cc and a melt index of about 0.8 to 0.9 g/10 min and 10-25% by weight of a linear low density polyethylene (LLDPE), ethylene/octene-1 copolymer having a density in the range of about 0.918 to 0.922 g/cc and a melt index of about 0.8 to 0.9 g/10 min. The inner and outer sealing layers preferably have the same polymeric constituents in the same ratios but can contain variations of the polymeric constituents, for example, variations of density and melt index in the above ranges and the polymeric constituents can have different ratios.

For this invention, the thickness of each of the sealing layers and said at least one outer is from about 1% to about 20% of the total thickness of the multi-layer film. In other embodiments of the invention, the total combined thickness of the sealant layers can be about 11%, about 12%, about 13%, about 14%, about 15%, about 16%, about 17%, about 18%, about 19%, about 20% of the total thickness of the multi-layer film. The total combined thickness of the sealing layers can also be intermediate percentage between the percentages cited, supra, for example, a total combined thickness that is from about 11.1%, 11.2%, 11.3%, 11.4%, etc. between other percentages cited.

The First and the Second Interposed Layers

The interposed layer is optional. In one embodiment, the multi-layer film comprises a first interposed layer adjacent to an outer sealant layer and adjacent to the core layer and on the other side of the core layer, a second interposed layer is adjacent to the core layer and adjacent to the inner sealant layer. The inner sealant layer is externally on one side of the multi-layer film, and the outer sealant layer is externally on the other side of the multi-layer film.

The multi-layer film comprises one first interposed layer or more than one interposed layer. For example, the multi-layer film can have two, three, or four interposed layers stacked adjacent to each other. Similarly, the multi-layer film comprises one second interposed layer or more than one second interposed layer.

While it may be preferred that the first interposed layer and the second interposed layer thicknesses are approximately the same, in other preferred embodiments, their thicknesses may vary and not be the same.

Also, while it is preferred that the multi-layer film of the present invention comprises the same number of first interposed layers and the second interposed layers, in other embodiments, the number of first interposed layers may be different from the number of second interposed layers.

The first or the second at least one interposed layers preferably comprises the preferred ethylene/α-olefin interpolymer Other useful interpolymers can have a density of from about 0.910 to about 0.917, preferably, 0.915 to and a melt-index of about 0.7 to 1.0, preferably, 0.915 g/10 min. The density range can also be defined by any two numbers from about 0.910 to about 0.912, about 0.913 to about 0.914, about 0.916 to about 0.917 g/cc and the like. Similarly, the melt-index range can be defined by any two numbers from about 0.5 to about 0.90 g/10 min.

For this invention, the total combined thickness of said first at least one interposed layer and said second at least one interposed layer is from about 1% to about 20% of the total thickness of the multi-layer film. In a preferred embodiment, the thickness of said at least one interposed layer is from about 1% of the total multilayer to about 19% of the total multilayer film thickness. The thickness of each of the interposed layers can be the same or each layer can vary, e.g., a layer can be about 3% and the second 17%, or 4-16%, 9-11% and the like.

Core Layer

The multi-layer film comprises at least one core layer that is adjacent to the first at least interposed layer on one side and the second at least one interposed layer on the opposite side. If an interposed layer is not used in the multilayer film, the core layer is adjacent to the sealant layer. The core layer comprises a polymer or a polymer blend of about 0-100% by weight or preferably of about 30-70% by weight of or more preferably 30-50% by weight of a linear low density polyethylene (LLDPE) of ethylene/octene-1 copolymer having a density of about 0.910 to 0.920 g/cc and melt index of about 0.8 to 1.2 g/10 min. and 0-100% by weight of a linear low density butene polyethylene (LLDPE) or low density hexene poyethylene having a density of about 0.918 to 0.930 g/cc and a melt index of about 0.8 to 1.2 g/10 min or preferably of 70-30% by weight of or more preferably 50-70% by weight of the linear low density butene polyethylene or linear low density hexene polyethylene. More preferably, the polymer blend of the core layer comprises blend of about 35-45% by weight of a linear low density polyethylene (LLDPE) having a density of about 0.914 to 0.918 g/cc and a melt index of about 0.9 to 1.1 g/10 min and 55-65% by weight of a linear low density butene polyethylene (LLDPE) having a density of about 0.918 to 0.920 and a melt index of about 0.9 to 1.1 g/10 min. Depending on the product and the conditions under which the product is stored, shipped and used, the core layer can contain up to 100% by weight of the preferred ethylene/α-olefin interpolymer. The percentage of the interpolymer can vary from 5, 10, 20, 30, 40, 50, 60, 70, 80 and 90% and any amounts between depending on the properties required for the multilayer film.

The core layer preferably is a single layer but can be a multilayer component each layer having the same or similar polymer blend within the above ranges. The thickness of the core layer can comprise about 30-50% of the total thickness of the multilayer film.

The present invention also is directed to a pouch containing a flowable material, said pouch being made from the previously described multi-layer film in tubular form and having transversely heat sealed ends.

The present invention is further directed to a process for making pouches filled with a flowable material, using a conventional bag making process describe hereinafter; Also, pouches can be made using a vertical form, fill and seal ("VFFS") apparatus, in which each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of a film made from a multilayer film described previously. The VFFS processes and its modifications are described in U.S. Pat. Nos. 5,538,590, 9,327,856 and 9,440,757 and are incorporated by reference herein in their entirety.

Although melt-index ranges are specified herein, it is understood that the polymers have melt indices typical of film-grade polymers can be used. The multi-layer films of the present invention have the ability to form a lap seal as well as a fin seal. They also substantially reduce the curl in the laminate.

One preferred method of manufacturing film is the so-called blown film process. The film, after manufacture, is slit longitudinally into appropriate widths. The preferred method of manufacture of a multilayer film is by using a blown film co-extrusion process, although other methods of manufacture of the film may be used.

The multilayer film of the invention is particularly useful in the formation of bags that may be used in the packaging of flowable materials, for example, liquids, as defined above. In particular, the bags are used in the packaging of refrigerated liquids in particular, milk.

Other Additives

It will be understood by those skilled in the art that additives such as antioxidants, stabilizers, anti-block agents, and slip additives, may be added to the polymers from which bags of the present invention are made. Optionally, the inner sealant layer, the outer sealant, the interposed layer may further comprise one or several additives useful to make easier the processing of a film in a bag making process, such as, for example, polymer processing aid concentrate, and/or slip/anti-block concentrates. Any of such additives well known to person skilled in the art can be used. Advantageously, the following additives are preferred.

Slip Agents

The range of the slip agents that can be used is from about 200 to 2000 ppm or 0.5-2.5% by weight of the sealing layer. A preferred slip agent is erucamide or other fatty acid amide, such as, oleamide. The slip agent lowers the coefficient friction of the film and allows it to slide readily over various surfaces.

Anti-Blocking Agents

Any film anti-blocking agent well known to skilled workman maybe added to the film layers in the range of about 1000-5000 ppm or 0.5-2.5% by weight of the sealant layer. Typical anti-blocking agents, such as, diatomaceous earth, synthetic silica or talc can be added to the inner and outer sealant layers of the film. The anti-blocking material is particularly useful in reducing the coefficient of friction between the film and the metallic surfaces over which the film is drawn during the bag making process.

Processing Aid

Any processing aid well known to skilled workman, preferably and not limited to fluoro-elastomer based polymer may be added to outer and inner sealing layers of the film.

Bag-Making Processes

This invention also relates to a process for making bags that are Tillable with flowable material, using a bag line, wherein each bag is made from a flat web of film by the following steps:
(I) Unwinding film from two rolls top and two rolls bottom.
(II) Ink jet code labeling each bag.
(III) Punching spout hole in each bag.
(IV) Inserting spout into bag.
(V) Brush bag to remove entrapped air.
(VI) Cross seals formed on bottom of one bag and top of next bag.
(VII) Bags pulled through line with servo drive.
(VIII) Perforations formed between adjacent cross seals.
(IX) Bags pushed to end of line via conveyor belt.
(X) Bags packed into boxes.

The above steps are typical for a bag making machine. It should be noted that the order of the steps can be changed depending on the bag-making machine.

Experimental

In the present set of experiments, generally, a multi-layer film is made using film extrusion processes that are well-known to the film manufacturing industry. The multi-layer film is extruded on a conventional extrusion line for multi-layer films such as a three-layer, five layer, seven layer, nine layer or more blown-film co-extrusion line. Films from the resin compositions of this invention can also be made using other film extrusion processes which are well-known to the film manufacturing industry.

To prepare the multilayer films of the following Examples, the following operating conditions were used:

line throughput—350 lbs./hour; blow up ration-2.5; lay-flat-38.65 inches; rolls double wound 2-up@ 16.75 inches width; each roll OD (outside diameter) 9.5 inches except for one set of rolls at 8.25 inches OD; dies size 250 mm; die gap 2 mils; air ring and IBC cooling @ 50° F. using air cooled by chilled water; rotating nip at carouse; auto gauge control; treaters OFF. The resulting film thickness is 1.8 mils.

Dairy bags made for testing: 2.5 gallon bag; production rate of 25 bags per minute; two ply bag where edges of bag heat sealed together using impulse sealing; 15.75 inch wide inside of seal to seal inside of seal; 18.00 inch long inside of seal to inside of seal; and dairy spout and cap.

Bruceton Stair Drop Test (Version of ASTM D 5276 A 2.4.2)

The Bruceton Stair test requires 30 well-made bags. The first bag is positioned with the longitudinal axis of the bag coincident with an imaginary horizontal line, the bottom surface of the bag at a suitable initial drop height, say 8 feet, and the vertical seal facing upwards. In this orientation, the bag is dropped onto a stainless steel sheet, and then inspected visually and tactilely for leakers. The test is conducted by maintaining the bag temperature at about 4° C.

If the first bag survives the drop test intact without leaking water, then a new bag is selected and dropped from a height of an additional 1 foot, that is, 9 feet. On the other hand, if the first bag has developed a leak, then a new bag is selected and dropped from a height, which is lower by 1 foot, that is, 7 feet. The testing continues, using a new bag for every drop, until at least 5 passes and 5 failures have occurred in the height range where both passes and failures are occurring. The 50% failure height is then calculated using the statistical method of ASTM 1 D 5628.

Abbreviations used in Examples:

Dow "Elite" AT 6401 ULDPE, ethylene/octene-1 copolymer, melt index 0.85 g/10 min., density 0.912 g/cc.

Dow "Elite" 5400 G—LLDPE, ethylene/octene copolymer, melt index 1.0 g/10 min., density 0.916 g/cc.

Dow XUS59900.100—LLDPE, ethylene/octene-1 copolymer, melt index 0.85 g/10 g/min., density 0.920 g/cc.

Dow "Innate" XUS 59910.04 (16C181R01) interpolymer of ethylene/octene-1 copolymer and a second ethylene/α-olefin copolymer, melt index 0.85 g/10 min. density 0.915 g/cc. DFDC 7087—LLDPE ethylene butene copolymer, melt index 1.0 g/10 min. density 0.918 g/cc.

Ampacet 10090 Slip Agent—carrier resin LDPE, density 0.92 g/cc, additive 5% erucamide.

Ampacet10063 Anti Block Agent—carrier resin LDPE, density 0.92 g/cc, anti-block additive 20%.

The following examples illustrate the invention.

Example 1

The following films were formed utilizing the extruder and extrusion conditions previously described.

Benchmark Structure is an industry standard having a thickness of 2.2 mils of a monolayer structure of 7 multiple layers comprising 37% by weight of (Dow "Elite"5400 G), LLDPE, ethylene octene copolymer, 60% (DFDC 7087) LLDPE, ethylene butane copolymer and 1.5% Ampacet Slip agent LDPE carrier resin and anti-block slip agent.

Multilayer Film Structure 3 is a multilayer structure having a thickness of 1.8 mils and comprises:

(1) an outer and an inner sealant layer comprising 97% by weight of (Dow "Innate" XUS 59910.04) the preferred ethylene/-α olefin interpolymer having melt index of 0.85 g/10 min. and density of 0.915 g/cc. and 1.5% by weight of Ampacet 10090 Slip Agent and 1.5% by weight of Ampacet Anti Block Agent (2) a core layer of multiple of 5 layers of 98.5% by weight of ("Elite" 5400) LLDPE, ethylene/octene-1 copolymer and 1.5% by weight of Ampacet 10090 Slip Agent.

Multi-layer Film Structure 4 having a thickness of 1.8 mils and comprises:

(1) an inner and an outer sealant layer comprising 97% by weight (Dow "Innate" XUS 59910.04) the preferred ethylene/-α olefin interpolymer and 1.5% by weight of Ampacet 10090 Slip Agent and 1.5% by weight of Ampacet Anti Block Agent and (2) a core layer of multiple 5 layers comprising 38.5% by weight ("Elite" 5400G) LLDPE, ethylene/octene-1 copolymer and 60.0% by weight of (DFDP 7087) LLDPE, ethylene butane copolymer having a melt index of 1.0 g/10 min. and a density of 0.918 g/cc. and 1.5% by weight of Ampacet 10090 Slip Agent.

Multilayer Film Structure 9 having a thickness of 1.8 mils and comprises:

(1) an inner and an outer sealant layer comprising 83% by weight of ("Elite AT 6401) ULDPE, ethylene/octene-1 copolymer having a melt index of 0.85 g/10 min. and density of 0.912 g/cc. and 14.0% by weight of (XUS 59900.100) LLDPE, ethylene/octene-1 copolymer having a melt index of 0.85 g/10 min. and density of 0.920 g/cc and 1.5% by weight of Ampacet 10090 Slip Agent and 1.5% by weight of Ampacet Anti Block Agent and;

(2) an interposed layer comprising 98.5% of (Dow "Innate" XUS 59910.04) the preferred ethylene/-α olefin interpolymer and 1.5% by weight of Ampacet 10090 Slip Agent;

(3) a core layer of multiple 3 layers comprising 38.5% by weight of ("Elite 5400G) LLDPE, ethylene/octene-1 copolymer having a melt index of 1.0 g/10 min. and density of 0.916 g/cc. and 60.0% by weight of (DFDC 7087) LLDPE, ethylene butene copolymer having a melt index of 1.0 g./10 min. and a density of 0.918 g/cc and 1.5% by weight of Ampacent 10090 Slip Agent.

Each of the above prepared film structures—Benchmark Structure, Structure 3, Structure 4, and Structure 9 were formed into bags for testing. 2.5 gallon dairy bags were formed as described above and filed with water and refrigerated to a temperature of about 4° C. and the bags were subjected to the Bruceton Stair Drop Test as described above. Also, bags were tested at ambient temperatures. The following are the test results of the test:

TABLE 1

| | | Bruceton Stair Drop Test Data | | | | | |
|---|---|---|---|---|---|---|---|
| Film Structure | F0 Film Thickness (Mils) | F0 Temp. Ambient Feet | F0 Temp. 4° C. Feet | F50 Temp. Ambient Feet | F50 Temp. 4° C. Feet | F100 Temp. Ambient Feet | F100 Temp. 4° C. Feet |
| Benchmark | 2.2 | 2.0 | 1.0 | 3.8 | 2.3 | 5.0 | 4.0 |
| Structure 3 | 1.8 | 3.0 | 3.0 | 4.6 | 5.0 | 7.0 | 7.0 |

TABLE 1-continued

| | | Bruceton Stair Drop Test Data | | | | | |
|---|---|---|---|---|---|---|---|
| Film Structure | F0 Film Thickness (Mils) | F0 Temp. Ambient Feet | F0 Temp. 4° C. Feet | F50 Temp. Ambient Feet | F50 Temp. 4° C. Feet | F100 Temp. Ambient Feet | F100 Temp. 4° C. Feet |
| Structure 4 | 1.8 | — | 4.0 | — | 5.8 | | |
| Structure 9 | 1.8 | 3.0 | 3.0 | 4.7 | 5.2 | 6.0 | 7.0 |

Example 2

Bags formed from film Structure 3 were filled at a major dairy customer with a refrigerated ice cream mixture. 6000 bags, 2.5 gallons size, were filled on a Liqui-Box Orbiter 6000 C6T-0 filler. A second 6000 bags formed from film Structure 9 were filled on the same equipment with a refrigerated ice cream product. No problems were encountered during filling of the bags and there were no problems in shipping and distribution of the bags and no problems were reported by the end users of these dairy product filled bags.

4800 2.5 gallon size bags of film Structure 9 were filled with a refrigerated diary product (ice cream) on a Liqui-Box 1500-CIT Pacesetter III and bag loading system and loaded into boxes. No problems were encountered during filling of the bags and there were no problems in shipping and distribution of the bags and no problems were reported by the end users of these dairy product filled bags.

The invention claimed is:

1. A multilayer film for making pouches containing flowable materials, said multi-layer film comprising the following layers in order, from an at least one inner sealant-layer to at least one core layer and to an at least one outer sealant-layer for packaging liquids comprising:
   (A) at least one outer sealant layer and at least one inner sealant layer, each layer comprising an ethylene/α-olefin interpolymer composition that comprises from 50-75% by weight of a first ethylene/α-olefin copolymer fraction having a density in the range of 0.894 to 0.908 g/cc; a melt index in the range of 0.2 to 1 g/10 min; and from 25 to 50 percent by weight of a second ethylene/α-olefin copolymer fraction and wherein the interpolymer has a density in the range of 0.910 to 0.924 g/cc and a melt index in the range from 0.5 to 2 g/10 min; a zero shear viscosity ratio (ZSVR) in the range of from 1.15 to 2.5; a molecular weight distribution, expressed as the ratio of the weight average molecular weight (Mw/Mn), in the range of 2.0 to 4.0;
   (B) at least one core layer selected from the group consisting of:
      (1) a core layer comprising linear low density polyethylene, ethylene/octene-1 copolymer having a melt index of 1.0 g/10 min and a density of 0.916 g/cc;
      (2) a core layer comprising 30-100% by weight of linear low density polyethylene, ethylene/octene-1 copolymer having a melt index of 1.0 g/10 min and a density of 0.916 g/cc and 70-0% of ethylene/butene copolymer having a melt index of 1.0 g/10 min and a density of 0.918 g/cc; and
      (3) a core layer comprising 30-100% by weight of linear low density polyethylene, ethylene/hexene-1 copolymer having a melt index of 1.0 g/10 min and density of 0.916 g/cc and 70-0% by weight of a linear low density ethylene/butene copolymer having a melt index of 1.0 g/10 min. and a density of 0.918 g/cc;
   wherein the multilayer film exhibits no reduction in toughness and seal strength at temperatures ranging from 0-10° C. to ambient temperatures, when formed as a pouch, as determined by a Bruceton Stair bag drop test.

2. The multilayer film of claim 1 wherein the at least one outer sealant layer, the at least one inner sealant layer and the core layer individually comprise a single layer up to and including eight layers.

3. The multilayer film of claim 2 wherein the ethylene/α-olefin interpolymer composition comprises a polymer fraction of linear low density polyethylene and a second copolymer fraction of ethylene/octene-1 copolymer and the ethylene/α-olefin interpolymer has a density of 0.915 g/cc and a melt index of 0.85 g/10 min.

4. The multilayer film of claim 3 wherein the at least one core layer comprises a linear low density polyethylene, ethylene/octene-1 copolymer having a melt index of 1.0 g/10 min and a density of 0.916 g/cc.

5. The multilayer film of claim 3 wherein the at least one core layer comprises 30-100% by weight of ethylene/octene-1 copolymer having a melt index of 1.0 g/10 min and a density of 0.916 g/cc and 70-0% of ethylene/butene copolymer having a melt index of 1.0 g/10 min and a density of 0.918 g/cc and the copolymers are in a ratio of 40/60.

6. The multilayer film of claim 3 wherein the at least one core layer comprises 30-100% by weight of ethylene/hexene-1 copolymer having a melt index of 1.0 g/10 min and density of 0.916 g/cc and 70-0% by weight of ethylene// butene copolymer having a melt index of 1.0 g/10 min and a density of 0.918 g/cc and the copolymers are a weight ratio of 40/60.

7. A multilayer film for making pouches containing flowable materials, said multi-layer film comprising the following layers in order, from an at least one inner sealant-layer to a first interposed layer to an at least one core layer to a second interposed layer and to an outer sealant-layer for packaging liquids comprising:
   (A) at least one outer sealant layer and at least one inner sealant layer, each layer comprising an ultra-low density polyethylene, ethylene/octene-1 copolymer having a melt index of 0.85 g/10 min and a density of 0.912 g/cc and an ethylene/α-olefin interpolymer composition comprising linear low density polyethylene, ethylene/octene-1 copolymer having a melt index of 0.85 g/10 min and a density of 0.920 g/cc;
   (B) the first interposed layer between the at least one core layer and the at least one outer sealant layer and the second interposed layer between the at least one core layer and the second outer sealant layer, each interposed layer comprising an ethylene/α-olefin interpolymer composition that comprises from 50-75% by weight of a first ethylene/α-olefin copolymer fraction having a density in the range of 0.894 to 0.908 g/cc; a melt index in the range of 0.2 to 1 g/10 min; and from 25 to 50 percent by weight of a second ethylene/α-olefin copolymer fraction and wherein the interpolymer has a density in the range of 0.910 to 0.924 g/cc and a melt index in the range from 0.5 to 2 g/10 min; a zero shear viscosity ratio (ZSVR) in the range of from 1.15 to 2.5; a molecular weight distribution, expressed as the ratio of the weight average molecular weight (Mw/Mn), in the range of 2.0 to 4.0;

(C) at least one core layer selected from the group consisting of:
  (1) a core layer comprising linear low density polyethylene, ethyleneloctene-1 copolymer having a melt index of 1.0 g/10 min and a density of 0.916 g/cc;
  (2) a core layer comprising 30-100% by weight of linear low density polyethylene, ethylene/octene-1 copolymer having a melt index of 1.0 g/10 min and a density of 0.916 g/cc and 70-0% of ethylene/butene copolymer having a melt index of 1.0 g/10 min and a density of 0.918 g/cc; and
  (3) a core layer comprising 30-100% by weight of linear low density polyethylene, ethylene/hexene-1 copolymer having a melt index of 1.0 g/10 min and density of 0.916 g/cc and 70-0% by weight of linear low density polyethylene, ethylene/butene copolymer having a melt index of 1.0 g/10 min and a density of 0.918 g/cc;

wherein the multilayer film exhibits no reduction in toughness and seal strength at temperatures ranging from 0-10° C. to ambient temperatures, when formed as a pouch, as determined by a Bruceton Stair bag drop test.

8. The multilayer film of claim 7 wherein the at least one outer sealant layer, the at least one inner sealant layer, the core layer and the interposed layers between the sealant layers and the core layer individually comprise a single layer up to and including eight layers.

9. The multilayer film of claim 7 wherein the at least one core layer comprises 30-100% by weight of linear low density polyethylene, ethylene/octene-1 copolymer having a melt index of 1.0 g/10 min and a density of 0.916 g/cc and 70-0% of ethylene/butene copolymer having a melt index of 1.0 g/10 min and a density of 0.918 g/cc in a weight ratio of 40/60.

10. The multilayer film of claim 7 wherein the at least one core layer comprises 30-100% by weight of linear low density polyethylene, ethylene/hexene-1 copolymer having a melt index of 1.0 g/10 min and density of 0.916 g/cc and 70-0% by weight of linear low density polyethylene, ethylene/butene copolymer having a melt index of 1.0 g/10 min and a density of 0.918 g/cc in a weight ratio of 40/60.

11. A bag for containing flowable liquid formed of the multilayer film of claim 1, wherein the bag exhibits no reduction bag drop performance at temperatures ranging from 0-10° C. to ambient temperatures, as determined by a Bruceton Stair bag drop test.

12. The bag of claim 11 wherein the flowable material is a refrigerated dairy product.

13. A bag for containing flowable liquid formed of the multilayer film of claim 7, wherein the bag exhibits no reduction in bag drop performance at temperatures ranging from 0-10° C. to ambient temperatures, as determined by a Bruceton Stair bag drop test.

14. The bag of claim 13 wherein the flowable material is a refrigerated dairy product.

15. The multilayer film of claim 1 wherein the at least one outer sealant layer and the at least one inner sealant layer comprise either an ethylene/hexene copolymer or an ethylene/octene copolymer.

* * * * *